Mar. 27, 1923.
G. KLETKE
1,449,514
OPERATING MECHANISM FOR THE ADJUSTING LEVERS OF HEADERS OR BINDERS
Filed Dec. 8, 1920 2 sheets-sheet 1
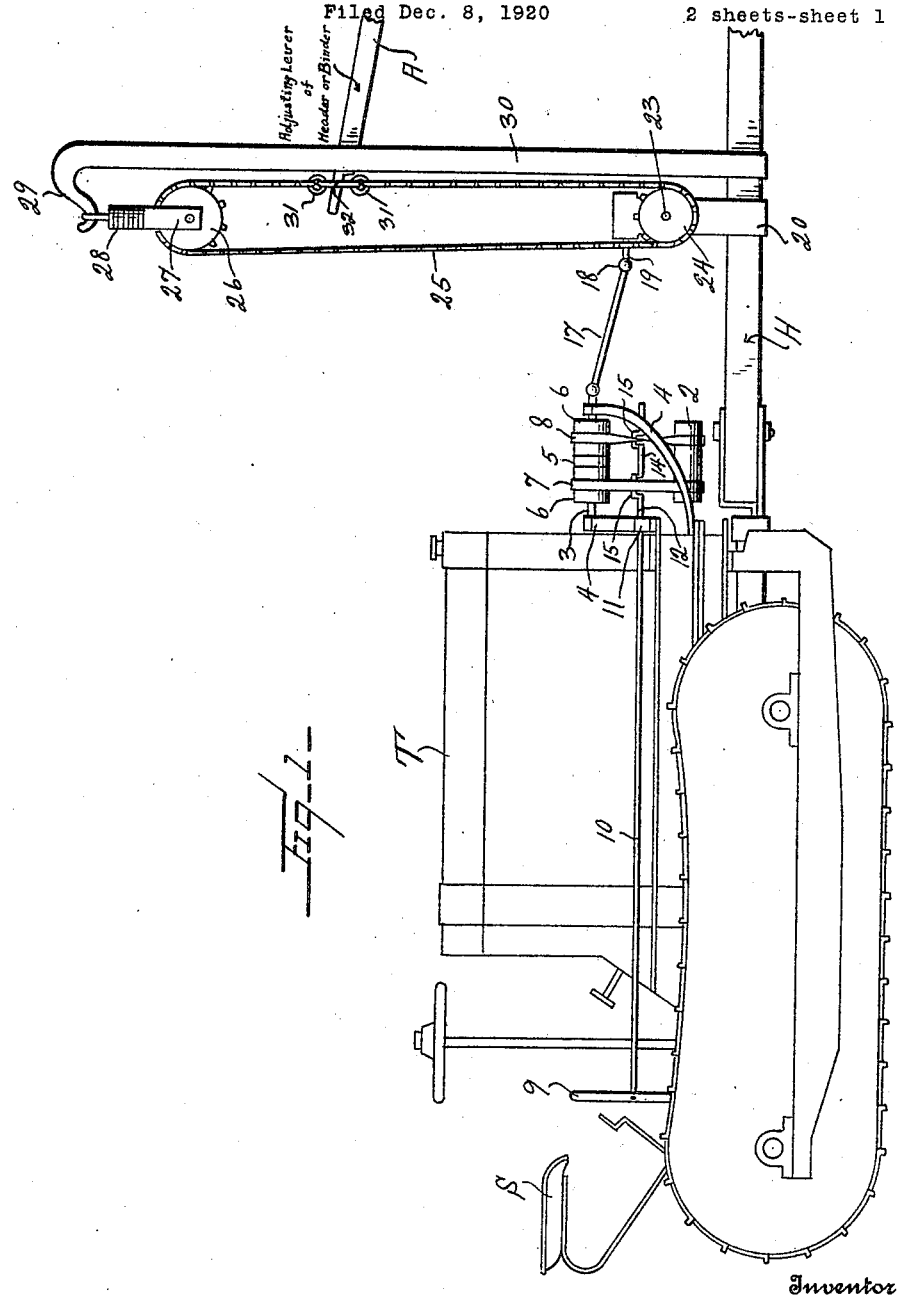
Inventor
G. Kletke
By Watson E. Coleman
Attorney

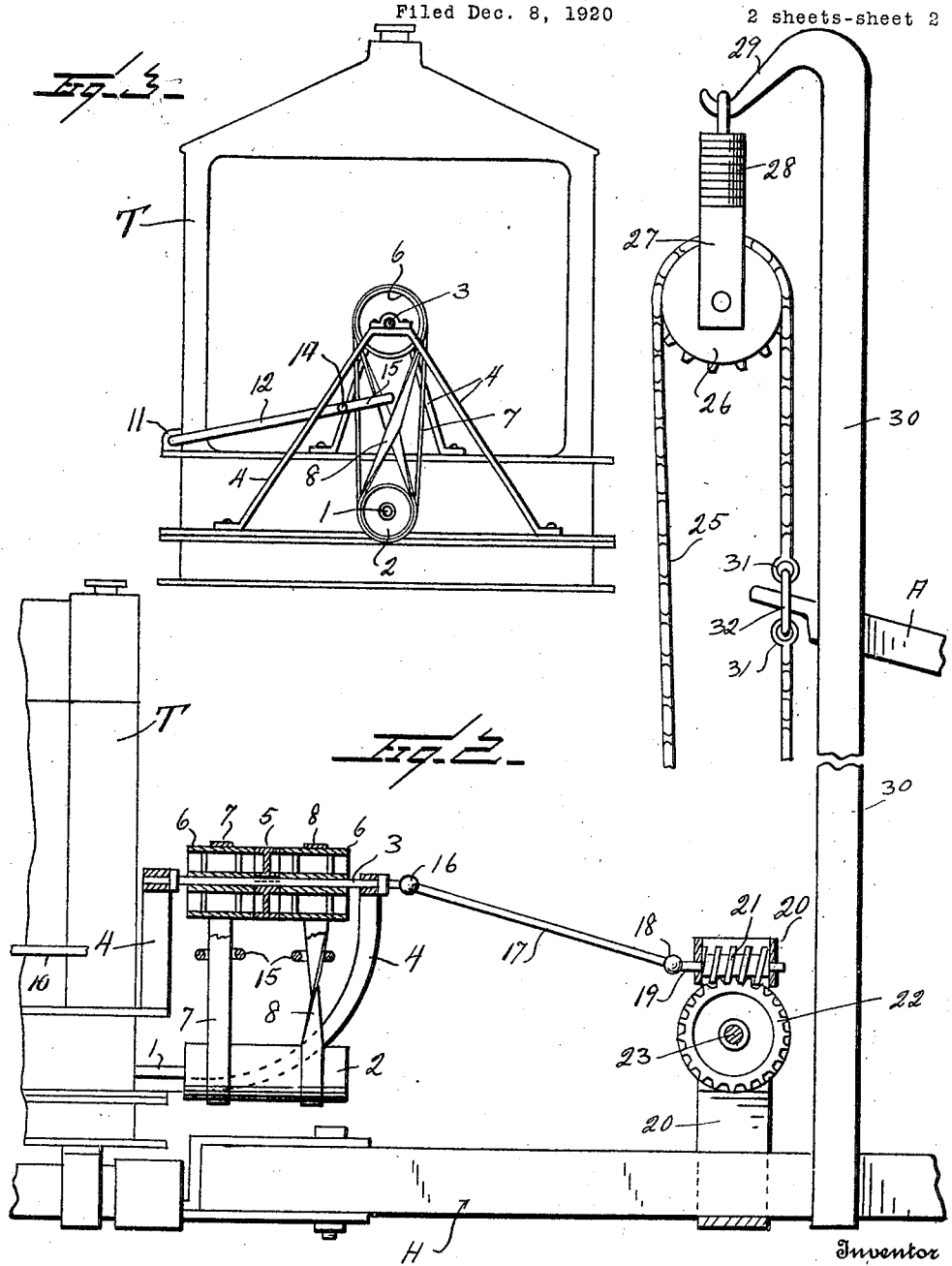

Patented Mar. 27, 1923.

1,449,514

UNITED STATES PATENT OFFICE.

GOTTLIEB KLETKE, OF ALVA, OKLAHOMA.

OPERATING MECHANISM FOR THE ADJUSTING LEVERS OF HEADERS OR BINDERS.

Application filed December 8, 1920. Serial No. 429,219.

*To all whom it may concern:*

Be it known that I, GOTTLIEB KLETKE, a citizen of the United States, residing at Alva, in the county of Woods and State of Oklahoma, have invented certain new and useful Improvements in Operating Mechanisms for the Adjusting Levers of Headers or Binders, of which the following is a specification, reference being had to the accompanying drawings.

This invention relates to an operating mechanism for the adjusting lever of a header or binder and particularly relates to a mechanism wherein a tractor is employed as the motive force for the header or binder, and it is an object of the invention to provide a novel and improved power driven means whereby the adjusting lever of the header or binder may be readily manipulated as the occasions of practice may necessitate.

Another object of the invention is to provide a novel and improved mechanism of this general character which may be readily and conveniently operated by the occupant of the seat of the tractor to effect the desired manipulation of the lever.

The invention consists in the details of construction and in the combination and arrangement of the several parts of my improved operating mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation illustrating a mechanism constructed in accordance with an embodiment of my invention, the header or binder being shown in fragment.

Figure 2 is an enlarged fragmentary view partly in elevation and partly in section illustrating in detail the mechanism for operating the adjusting lever of the header or binder, the rod 10 being shown in fragment and Figure 3 is a view in front elevation of the tractor as herein disclosed with certain of the parts omitted.

As disclosed in the accompanying drawings, T denotes a tractor of a conventional type and which is operatively engaged with the platform of a header or binder H. A denotes an adjusting lever common to these types of agricultural machines, such for example as is disclosed in Patent No. 735,983, dated Aug. 11, 1903. As the header or binder forms no part of the present invention, a detail description or illustration thereof is believed to be unnecessary.

Extending forwardly from the tractor T is a shaft 1 in driven connection with the motor of the tractor. Mounted upon the outer end portion of the shaft 1 is an elongated drum 2. Above the shaft 1 is a second shaft 3 rotatably supported by the brackets 4. The brackets 4 are carried by the forward end portion of the tractor T.

Fixed to the shaft 3 is a pulley 5 and mounted upon said shaft 3 at opposite sides of the pulley 5 and closely adjacent thereto are the loose pulleys 6, each of said pulleys 6 being of material length. As is illustrated in Figures 1 and 2, one of the pulleys 6 has disposed therearound a straight belt 7 also directed around the pulley 2 while the second pulley 6 has directed therearound a crossed belt 8 also operatively engaged with the pulley 2.

The tractor T at a point in close proximity to the seat structure S is provided with an upstanding lever 9 adapted to be operated as required by the occupant of the structure S. Operatively engaged with the lever 9 is an end portion of a forwardly directed rod 10 having its forward end portion disposed through a guide 11. The rod 10 in advance of the guide 11 is continued by an inwardly directed arm 12 terminating in a forwardly and outwardly directed extension 14.

The extension 14 is provided with the offset portions 15 each of which receives a stretch of a belt 7 or 8 so that upon endwise movement of the rod 10, one of said belts will be shifted into or out of operative engagement with the fixed pulley 5. When the belt 7 is operatively engaged with the pulley 5, the shaft 3 will be rotated in one direction and when the belt 8 is operatively engaged with said pulley 5, the shaft 3 will be rotated in the reverse direction. When the belts are in the positions illustrated in Figures 1 and 2, or free of engagement with the fixed pulley 5, the shaft 3 is stationary.

Connected to the forward end portion of the shaft 3 by a universal joint 16 is an end portion of a shaft section 17. The opposite end portion of the shaft section 17 is coupled by a universal joint 18 with an end portion of the shaft 19 rotatably supported by an upstanding bracket 20 carried by the header or binder H. The shaft 19 carries a worm 21 meshing with the worm gear 22 fixed to the shaft 23 rotatably supported by the bracket 20 below the shaft 19.

The shaft 23 also has fixed thereto a sprocket wheel 24 with which is operatively engaged a sprocket chain 25. The chain 25 is also operatively engaged with a sprocket wheel 26 rotatably supported by a block 27. The block 27 is suspended by a coil spring 28 from a rearwardly directed goose neck 29. The goose neck 29 is carried by the upper end portion of an upstanding post or pillar 30 suitably secured to the rear portion of the header or binder H.

The chain 25 terminates at its opposite ends in the eye members 31 operatively engaged with an annular member or ring 32. The outer or free end portion of the adjusting lever A is disposed through the annular member or ring 32 so that as the annular member or ring 32 is raised or lowered, the lever A will be correspondingly moved.

From the foregoing description it is thought to be obvious that an operating mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with an agricultural machine including an adjusting lever and a tractor coupled to said machine, a drum carried by the tractor, means for rotating the drum, a shaft supported by the tractor, a pulley fixed to the shaft, loose pulleys on the shaft at opposite sides of the fixed pulley, a straight belt coacting with one of the loose pulleys and the drum, a crossed belt coacting with one of the loose pulleys and the drum, means for shifting the belts to engage one of the belts with the fixed pulley, the second belt being engaged with its loose pulley when the other belt is engaged with the fixed pulley, and means driven from the shaft and operatively engaged with the adjusting lever to raise or lower said lever in accordance with the direction of rotation of the shaft.

2. In combination with an agricultural machine including an adjusting lever and a tractor coupled to said machine, a drum, a shaft supported by the tractor, vertically spaced rotatable members carried by the agricultural machine and positioned above and below the adjusting lever, an endless member engaged with said rotatable members and in operative engagement with the lever, a driving connection between the shaft and one of the rotatable members, and means for rotating the shaft.

3. In combination with an agricultural machine including an adjusting lever and a tractor coupled to said machine, a drum, a shaft supported by the tractor, vertically spaced rotatable members carried by the agricultural machine and positioned above and below the adjusting lever, an endless member engaged with said rotatable members and in operative engagement with the lever, a driving connection between the shaft and one of the rotatable members, and means for rotating the shaft in opposite directions.

4. In combination with an agricultural machine including an adjusting lever and a tractor coupled to said machine, a drum, a shaft supported by the tractor, vertically spaced rotatable members carried by the agricultural machine and positioned above and below the adjusting lever, an endless member engaged with said rotatable members and in operative engagement with the lever, a member in driving connection with one of the rotatable members, a shaft section having universal connection with the last named member and with the shaft, and means for rotating the shaft.

5. In combination with an agricultural machine including an adjusting lever and a tractor coupled to said machine, a drum, a shaft supported by the tractor, vertically spaced rotatable members carried by the agricultural machine and positioned above and below the adjusting lever, an endless member engaged with said rotatable members and in operative engagement with the lever, a worm in driving connection with one of the rotatable members, a shaft section having universal connection with the worm and with the shaft, and means for rotating the shaft.

In testimony whereof I hereunto affix my signature.

GOTTLIEB KLETKE.